(12) United States Patent
Liu et al.

(10) Patent No.: US 12,297,868 B2
(45) Date of Patent: May 13, 2025

(54) SEAL FOR TAPER ROLLER BEARING AND TAPER ROLLER BEARING ASSEMBLY

(71) Applicant: Aktiebolaget SKF, Gothenburg (SE)

(72) Inventors: Jie Liu, Quzhou (CN); Jinyan Lu, Yinchuan (CN); Xiaozhou Zhu, Quzhou (CN)

(73) Assignee: Aktiebolaget SKF, Gothenburg (SE)

( * ) Notice: Subject to any disclaimer, the term of this patent is extended or adjusted under 35 U.S.C. 154(b) by 95 days.

(21) Appl. No.: 17/970,776

(22) Filed: Oct. 21, 2022

(65) Prior Publication Data

US 2023/0147394 A1 May 11, 2023

(30) Foreign Application Priority Data

Nov. 9, 2021 (CN) .......................... 202111318942.0

(51) Int. Cl.
*F16C 33/78* (2006.01)
*F16C 19/36* (2006.01)

(52) U.S. Cl.
CPC ........ *F16C 33/7813* (2013.01); *F16C 19/364* (2013.01); *F16C 33/7823* (2013.01); *F16C 33/783* (2013.01); *F16C 33/7889* (2013.01)

(58) Field of Classification Search
CPC .................... F16C 33/7813; F16C 33/7823; F16C 33/783; F16C 33/7889
See application file for complete search history.

(56) References Cited

U.S. PATENT DOCUMENTS

| | | | | |
|---|---|---|---|---|
| 3,049,357 | A | * 8/1962 | Kosatka | F16C 33/7889 |
| | | | | 277/575 |
| 4,043,620 | A | * 8/1977 | Otto | F16C 33/7813 |
| | | | | 384/489 |
| 4,919,551 | A | * 4/1990 | Nunotani | F16H 57/04 |
| | | | | 277/408 |

\* cited by examiner

*Primary Examiner* — James Pilkington
(74) *Attorney, Agent, or Firm* — GARCIA-ZAMOR INTELLECTUAL PROPERTY LAW, LLC; Ruy Garcia-Zamor

(57) ABSTRACT

The present invention may comprise a seal for a taper roller bearing. The seal includes: a frame having: an outer flange, extending radially outward, an inner flange, extending radially inward, an middle flange, located between the outer flange and the inner flange and extending in an axial direction. The outer flange, the inner flange and the middle flange are integrally formed; a sealing ring, at least connects and covers the radial outer side of the outer flange of the frame, and has at least one sealing lip extending outward in the radial direction.

7 Claims, 2 Drawing Sheets

SEAL FOR TAPER ROLLER BEARING AND TAPER ROLLER BEARING ASSEMBLY

CROSS-REFERENCE TO RELATED APPLICATIONS

This application claims priority to Chinese Patent Application no. 202111318942.0, filed Nov. 9, 2021, the contents of which is fully incorporated herein by reference.

TECHNICAL FIELD

The invention provides a seal for a taper roller bearing and a taper roller bearing assembly.

BACKGROUND

A taper roller bearing usually has an outer ring, an inner ring, rollers and a cage. Due to the structural characteristics of a taper roller bearing, there is usually an axial position difference between the shoulder with large flange of the inner ring and the shoulder of the outer ring on the same side, which makes it difficult to seal the taper roller bearing. Especially when a taper roller bearing is applied to mechanical equipment with harsh working environment such as lawn mowers, the lack of sealing will lead to leakage of lubricating oil, entry of pollutants into the bearing, reduction of bearing life and various other potential safety hazards.

Therefore, it is desirable to provide a sealing structure for taper roller bearing and a taper roller bearing assembly with such a sealing structure, especially for sealing taper roller bearings used in harsh working environment.

SUMMARY

In view of this, the present invention provides a seal for a taper roller bearing, the seal comprising: a frame having: an outer flange, extending radially outward, an inner flange, extending radially inward, an middle flange, located between the outer flange and the inner flange and extending in an axial direction; wherein the outer flange, the inner flange and the middle flange are integrally formed; a sealing ring, at least connects and covers the radial outer side of the outer flange of the frame, and has at least one sealing lip extending outward in the radial direction.

Furthermore, that invention also provide an assembly for a taper roller bear, which comprises a taper roller bearing, wherein an inn ring of that taper roller bearing comprises a shoulder with a large flange; and a seal as described above; wherein the middle flange is in interference fit with the outer circumferential surface of the shoulder, and the inner flange presses against and covers at least a part of the large flange.

When that seal and the taper roll bearing assembly containing the seal of the present invention are particularly suitable for mechanical equipment in harsh working environment (for example machines like lawn mowers), external pollutants can be effectively prevented from entering the bearing, the influence on the service life of the bearing can be reduced, internal oil leakage can be effectively prevented, potential safety risks can be reduced, and the maintenance frequency of the equipment can be decreased. Furthermore, the seal of the invention has a simple structure, which can ensure the improvement of precision, the reduction of resistance and heat, and at the same time, can ensure that the main shaft and the housing to which the bearing is applied remain unchanged, so that the seal of the invention can be applied without adaptive modification of other structures.

DETAILED DESCRIPTION OF THE EMBODIMENTS

For convenience of explanation, the rotational axis direction of a taper roller bearing is referred to as axial direction, and the direction perpendicular to the axial direction is referred to as radial direction. The term "inner/inside" refers to the direction towards the inner side of the bearing, whereas the term "outer/outside" refers to the direction towards the outer side of the bearing.

The invention provides a seal, which is especially suitable for the taper roller bearing to seal on the side of the flange thereof. The invention also provides a taper roller bearing assembly comprising the seal.

Figure 1A:
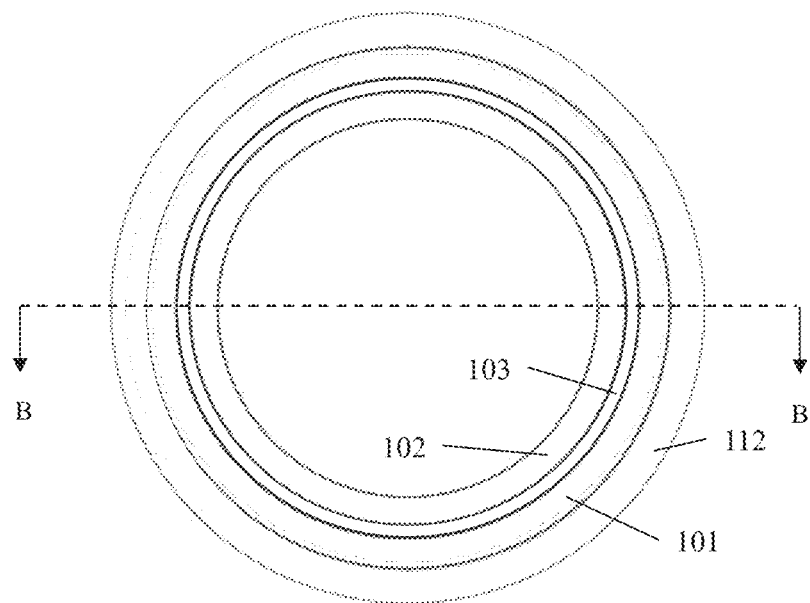
FIG. 1A shows a bottom view of a seal according to a preferred embodiment of the present invention.
Figure 1B:
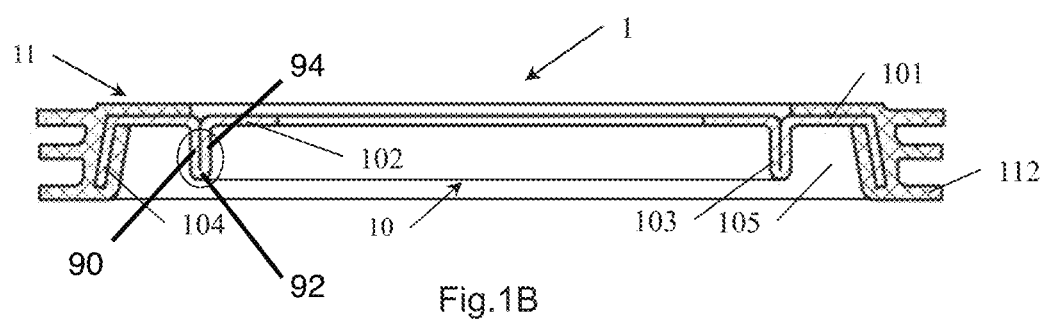
FIG. 1B shows a cross-sectional view of a seal according to a preferred embodiment of the present invention, taken along the B-B line of FIG. 1A.
Figure 2:
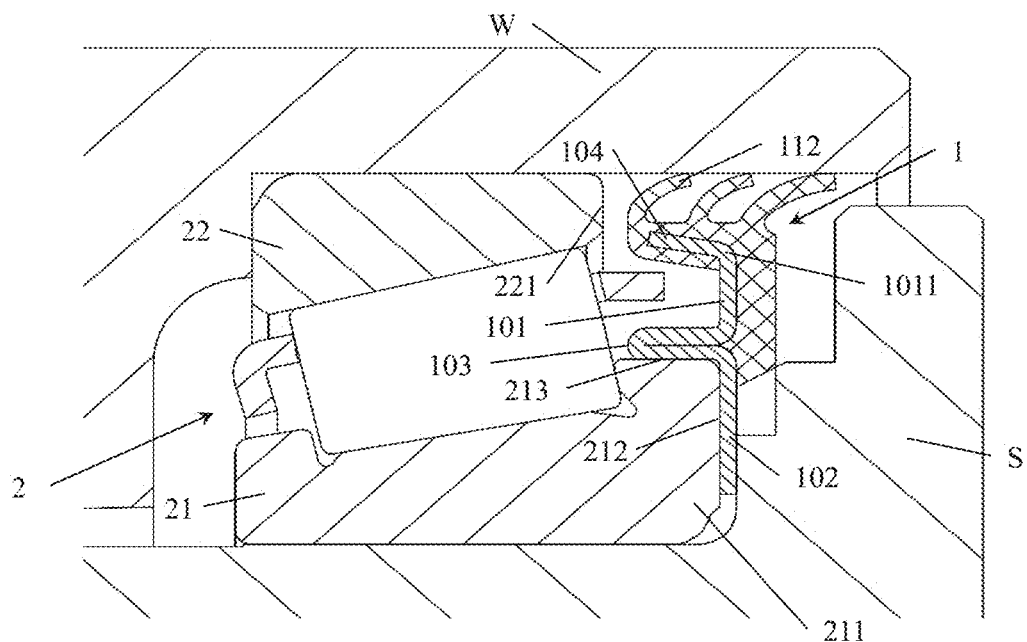
FIG. 2 shows a part of a taper roller bearing assembly with a seal according to a preferred embodiment of the present invention.

Specifically, referring to FIGS. 1A-3, a seal 1 according to an embodiment of the present invention includes a frame 10 and a sealing ring 11. Specifically, the frame 10 and the sealing ring 11 are formed in a ring shape to adapt to the shape of the taper roller bearing 2. Furthermore, as shown in FIG. 2, the inner ring 21 of the taper roller bearing 2 (hereinafter simply referred to as the bearing 2) includes a shoulder 211 with a large flange 212, and there is an axial position difference between the shoulder 211 and the shoulder 221 of the outer ring 22 on the same side. The shoulder 211 also has an outer circumferential surface 213.

In the seal 1 of this embodiment, the frame 10 has an outer flange 101, an inner flange 102 and a middle flange 103. Specifically, the outer flange 101 extends radially outward. The inner flange 102 extends radially inward. The middle flange 103 is located between the outer flange 101 and the inner flange 102 and extends generally in the axial direction. That is, the middle flange 103 extends in the axial direction with respect to the outer flange 101 and the inner flange 102. Therefore, in the cross section of the sealing ring, the three flanges form, for example, a substantially T-shaped structure, especially as shown in FIG. 2. When the seal 1 is installed on the bearing 2, the middle flange 103 extends toward the taper roller bearing 2.

Further, the outer flange 101, the inner flange 102 and the middle flange 103 of the frame 10 are integrally formed. And further preferably, the thickness of the middle flange 103 may be greater than thickness of the outer flange 101 and the inner flange 102, for example. The middle flange 103 with a greater thickness can provide more strength, so that after the seal 1 is assembled to the bearing 2 through interference fit with the shoulder 211, it can be ensured that the seal 1 will not easily fall off during the running of the bearing 2.

According to some preferred embodiments, for example, the outer flange 101, the inner flange 102, and the middle flange 103 of the frame 10 can be integrally formed by stamping a steel or any other suitable material. In the frame 10 formed by sheet stamping process, the middle flange 103 is formed to have a sheet folded portion in the axial direction, as shown by the oval portion in FIG. 1B, so that the thickness of the middle flange 10 is greater than thickness of the outer flange 101 and/or the inner flange 102. For example, according to a preferred embodiment, the thickness of the middle flange 103 of such folded structure can be twice the thickness of the outer flange 101 or the inner flange 102 of the frame 10, respectively.

Of course, it should be understood that the frame can also be formed by any other suitable materials and working processes, for example, it can be formed by injection molding of materials such as resin, etc., depending on the bearings, seals, structures and occasions to which they are to be applied. Meanwhile, similar to the middle flange 104 of the folded configuration as described above, the thickness of the middle flange formed by the injection molding process is set to be greater than that of the outer flange and/or the inner flange, for example, the thickness of the middle flange may be 1.5-3 times of the thickness of the outer flange and/or the inner flange. As best shown in FIG. 1b, the middle flange 103 is formed by a first axially extending portion 90 and a second axially extending portion 94. A bend 92 is formed between the first axially extending portion and the second axially extending portion.

Further, when the seal 1 is installed on the bearing 2, the middle flange 103 of the frame 10 can engage with the outer circumferential surface 213 of the shoulder 211 of the bearing inner ring 21 by interference fit, and the inner flange 102 can press against and cover at least a part of the large flange 212 of the shoulder 211. For example, the inner flange 102 can press against and cover more than half of the large flange 21 of the shoulder 211. Therefore, the middle flange 103 and the inner flange 102 are preferably formed to have certain rigidity and appropriate dimensions, so that the sealing ring 1 can be firmly interference-fitted with the shoulder 211 of the bearing inner ring 21 and cover the appropriate part of the large flange 21 without affecting the running of the bearing.

Furthermore, the sealing ring 11 of the seal 1 is connected to and covers at least the radial outer side 1011 of the outer flange 101 of the frame 10. In the embodiment shown in FIG. 3, the sealing ring 11 may only be connected to and cover the radially outer side of the outer flange 101. In the preferred embodiment shown in FIGS. 1A-3, for example, the sealing ring 11 can further connect and cover the transition from the middle flange 103 to the outer flange 101 and the inner flange 102. Therefore, for example, in the case of forming a frame by stamping a sheet, the sealing ring 11 can cover the gap at the above-mentioned transition of the middle flange 103 to prevent the gap from being polluted or the like. Further, preferably, the sealing ring 11 can be connected to and cover a part of the inner flange 102, for example, as shown in FIGS. 1A-2.

For example, the connection of the seal 1 can be achieved by bonding with suitable adhesive or by any other suitable means. Furthermore, the sealing ring 11 can be made of suitable materials, such as nitrile rubber, hydrogenated nitrile rubber, fluororubber (more preferably), polyurethane, etc., and can also be made of polymer elastomer or even polytetrafluoroethylene polymer material.

In addition, the sealing ring 11 also has at least one sealing lip 112 extending outward in the radial direction, which can be in interference fit with the wall W of the housing used to accommodate the taper roller bearing. In the preferred embodiment shown in FIGS. 1A-3, the sealing ring 11 may include three sealing lips 112.

According to a further preferred embodiment, the frame 10 may further include a supporting flange 104. The supporting flange 104 is integrally formed with the outer flange 101 and extends from the outer edge 1011 of the outer flange 101 in the axial direction. In other words, by using the axial position difference between the flanges of the outer ring and the inner ring of the bearing 2 as described above, the supporting flange 104 can extend from the outer edge 1011 toward the outer ring 22 of the bearing 2 to form a groove 105 between the supporting flange 104 and the middle flange 103.

This supporting flange 104 extending along the axial direction can form a structure capable of withstanding the pressure from the radial direction, and at the same time, it also provides flexibility for the frame 10 and the whole seal 1, thus strengthening the structure of the seal 1. In addition, the groove 105 can also form a space for avoiding the edge of the cage in the bearing 2, so as to prevent the seal 1 from affecting the running of the bearing 2.

Further, preferably, the supporting flange 104 extends parallel to the axial direction from the outer edge 1011 of the outer flange 101. Alternatively, the supporting flange 104 extends inclinedly outward relative to the axial direction from the outer edge 1011 of the outer flange 101.

In the preferred embodiment shown in FIGS. 1A-3, the supporting flange 104 extends inclinedly outward relative to the axial direction ("extends upward" in the orientation shown in FIG. 2), and its inclination angle is, for example, 5-15°. Three sealing lips 112 extend from the part of the sealing ring 11 that completely covers the supporting flange 104. When the seal with such a configuration is assembled on the bearing 2 and then installed on the structure to which the bearing 2 is applied (such as a lawn mower, etc.), the interference fit between the bearing housing W and the sealing lip 112 will press the sealing lip 112, thus forming a seal. At the same time, due to the inclined configuration of the supporting flange 104, it can well withstand the pressure in the radial direction and support the sealing lip 112 there above. In addition, as mentioned above, all the structures of the frame 10 can be integrally formed through the stamping process, including the outer flange 101, the inner flange 102, the middle flange 103 and the supporting flange 104 can be integrally formed.

The sealing ring 11 also preferably includes a part that completely covers the supporting flange 104 and is connected with the supporting flange 104 by bonding agent. This bonding method is the same as that for the sealing ring 11 and the outer flange 101 mentioned above. Furthermore, for example, at least one sealing lip 112 may extend from the part of the sealing ring 11 that completely covers the supporting flange 104.

According to a further preferred embodiment, at least a part of the inner flange 102 can be sandwiched between the large flange 212 and the fixation structure for the taper roller bearing. As shown in FIG. 2, when the bearing 2 is assembled to the shaft, the inner flange 102 is sandwiched between the shoulder S of the shaft and the large flange 212 of the shoulder 211 of the bearing 2, thereby further strengthening the fixing and positioning of the seal 1. It should be understood that besides the shoulder S, the fixation structure can be any other fixation structure related to the installation of bearings, shafts and seals.

Figure 3:
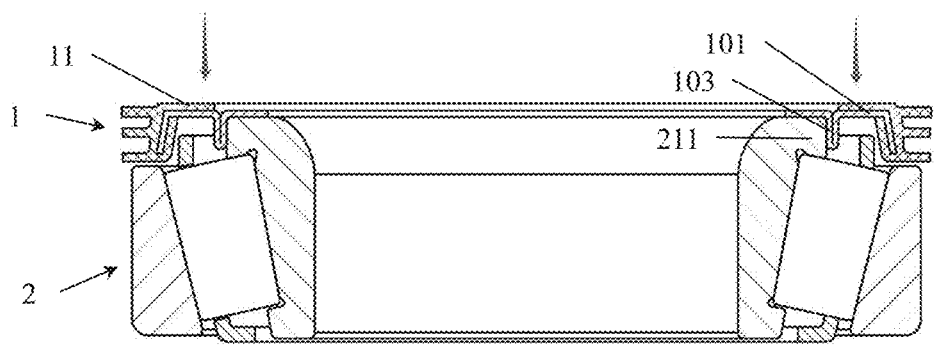
FIG. 3 shows the installation manner of the seal and taper roller bearing assembly according to the preferred embodiment of the present invention.

Referring to FIG. 3, the preferred installation method for installing the seal according to the present invention will be described as follows: the bearing 2 is fixed on a workbench (not shown but below the bearing 2), and the seal 1 is placed on the bearing 2, so that the related assembly structures of the two are roughly aligned; then, by using a hydraulic press, the seal 1 is pressed down onto the bearing 2 (as shown by the arrow in FIG. 3), so that the middle flange 103 of the seal 1 is in interference fit with the shoulder 211 with the large flange of the inner ring of the bearing 2. The taper roller bearing equipped with the seal of the present invention can then be applied to related shaft structures.

The invention provides a seal especially suitable for taper roller bearings and a taper roller bearing with the seal. The seal can be manufactured in a simple manner and can be installed to the bearing in a simple installation manner. Therefore, when it is applied to mechanical equipment in harsh working environment (such as lawn mowers), it can effectively prevent external pollutants from entering the bearing and reduce the influence on the bearing life. Moreover, through the interference fit between the middle flange and the shoulder and placing the inner flange between the bearing shoulder and the fixation structure, the internal oil leakage can be effectively prevented, the potential safety hazards can be reduced, and the maintenance frequency of the equipment can be decreased. Furthermore, the seal of the invention has a simple structure, which can ensure the improvement of precision, the reduction of resistance and heat, and at the same time, can ensure that the main shaft and the housing to which the bearing is applied remain unchanged, so that the seal of the invention can be applied without adaptive modification of other structures.

The invention claimed is:

1. A seal for a taper roller bearing, the seal comprising:
   a frame having:
      an outer flange, extending radially outward,
      an inner flange, extending radially inward,
      a middle flange, located between the outer flange and the inner flange and extending in an axial direction; and
      a supporting flange integrally formed with the outer flange and extending from an outer edge of the outer flange in the axial direction to form a groove between the supporting flange and the middle flange;
      wherein the outer flange, the inner flange and the middle flange are integrally formed; and
      wherein the outer flange is positioned between the supporting flange and the middle flange;
   a sealing ring that at least connects and covers a radial outer side of the outer flange of the frame and has at least one sealing lip extending outward in the radial direction; and
   wherein the middle flange comprises a first axially extending portion and a second axially extending portion, the first axially extending portion and the second axially extending portion being connected by a bend, the middle flange being parallel to the axial direction.

2. The seal according to claim 1, wherein,
   the supporting flange extends from the outer edge of the outer flange in parallel with the axial direction; or
   the supporting flange extends inclinedly outward from the outer edge of the outer flange relative to the axial direction.

3. The seal according to claim 1, wherein the sealing ring further comprises a part that completely covers the supporting flange and connects with the supporting flange by bonding agent.

4. The seal according to claim 3, wherein the at least one sealing lip extends outward from the part of the sealing ring that completely covers the supporting flange.

5. The seal according to claim 1, wherein the inner flange and the outer flange are parallel.

6. A seal for a taper roller bearing, the seal comprising:
   a frame having:
      an outer flange, extending radially outward,
      an inner flange, extending radially inward,
      a middle flange, located between the outer flange and the inner flange and extending in an axial direction; and
      a supporting flange integrally formed with the outer flange and extending from an outer edge of the outer flange in the axial direction to form a groove between the supporting flange and the middle flange;
      wherein the outer flange, the inner flange and the middle flange are integrally formed; and
      wherein the outer flange is positioned between the supporting flange and the middle flange;
   a sealing ring that at least connects and covers a radial outer side of the outer flange of the frame and has at least one sealing lip extending outward in the radial direction; and
      wherein the frame is integrally formed by a sheet stamping process, so that the middle flange is formed with a sheet folded portion, and the thickness of the sheet folded portion is greater than the thickness of the outer flange and/or the thickness of the inner flange; or
      the frame is integrally formed by an injection molding process, so that the thickness of the middle flange is greater than that of the outer flange and/or the inner flange.

7. The seal according to claim 6, wherein the inner flange and the outer flange are parallel.

* * * * *